United States Patent [19]

Ogasa et al.

[11] 3,968,267
[45] July 6, 1976

[54] CONTINUOUS PROCESS FOR PREPARING A WHIPPED-CREAM TOPPING DESSERT

[75] Inventors: Katsuhiro Ogasa, Yokohama; Shigeo Okonogi; Hiroya Yuguchi, both of Tokyo; Yoshinobu Hayashi, Kamakura; Yusuke Miyazaki, Tokyo, all of Japan

[73] Assignee: Morinaga Milk Industry Co., Ltd., Tokyo, Japan

[22] Filed: June 13, 1975

[21] Appl. No.: 586,804

[30] Foreign Application Priority Data

June 14, 1974 Japan.............................. 49-67186

[52] U.S. Cl. .............................................. 426/570
[51] Int. Cl.² .......................................... A23G 3/00
[58] Field of Search ............ 426/570, 575, 576, 564

[56] References Cited
UNITED STATES PATENTS

| | | | |
|---|---|---|---|
| 2,868,653 | 1/1959 | Diamond ............................ | 426/570 |
| 3,434,848 | 3/1969 | Katz .................................... | 426/570 |
| 3,579,355 | 5/1971 | Wyss et al .......................... | 426/576 |
| 3,582,357 | 6/1971 | Katz .................................... | 426/570 |

*Primary Examiner*—Jeanette M. Hunter
*Attorney, Agent, or Firm*—Oblon, Fisher, Spivak, McClelland & Maier

[57] ABSTRACT

A whipped-cream topping dessert is prepared by a process comprising the steps of: (a) formulating an aqueous mixture containing 10 to 30 percent by weight of fat, 3 to 6 percent by weight of milk protein, 12 to 22 percent by weight of saccharide, 0.3 to 0.8 percent by weight of emulsifier, 0.05 to 0.15 percent by weight of thickening agent and 0.3 to 0.6 percent by weight of gelling agent; (b) homogenizing said mixture; (c) pasteurizing and cooling the mixture to room temperature; (d) thereafter adding an aqueous solution of a calcium salt to said mixture so that the amount of calcium ion in said mixture is 10 to 35 mg. per 1 gram of the milk protein; (e) whipping and heating the resultant mixture at a temperature of 25° to 30°C to prepare a flowable whipped-cream; (f) topping said whipped-cream onto a lower layer dessert base maintained at a temperature of 50° to 70°C which has previously been placed into a container; and (g) solidifying both layers by cooling.

10 Claims, No Drawings

CONTINUOUS PROCESS FOR PREPARING A WHIPPED-CREAM TOPPING DESSERT

BACKGROUND OF THE INVENTION

1. Field of the Invention

The present invention relates to a continuous process for preparing a whipped-cream topping dessert topped by a whipped-cream layer on a layer of jelly, pudding, bavarois or the like. The lower layer is hereinafter referred to as the "dessert base".

2. Description of the Prior Art

Recently, with the change of the world's eating habits, more delicious and elaborate desserts are being demanded. As a result, various new kinds of desserts have been developed and preparative techniques for them are continually being advanced. Among them, a whipped-cream topping dessert, i.e., a dessert of two or three layers composed of an upper layer of cream, whipped at a temperature below 10°C, on a lower layer of dessert base previously solidified by cooling, has presently attracted special interest. This type of product is usually prepared by placing a dessert base into a container, solidifying it by cooling and thereafter topping it with cream whipped at below 10°C. However, in the conventional method mass production by machinery is difficult and manual techniques must be employed. This occurs because a long period of time is required from the point of placing the dessert base into the container to the end of the cooling-solidification process. Furthermore, the container cannot be closed until the dessert is completely solidified by cooling and the whipped-cream has been topped thereon. Therefore, the conventional method of manufacture is expensive and is unsanitary.

Among the whipped-cream topping desserts produced in Europe recently, there is a product prepared by placing a dessert base solidified to a paste or weak gel at below 10°C containing gelatin and/or modified starch (mainly pre-gelatinized starch) into a container and immediately topping whipped-cream at below 10°C thereupon. However, the resultant whipped-cream topping desserts are not preferred since they have the consistency of an elastic gel solidified for a long time at a low temperature or of a weak structure of a paste-like gel. Moreover, the product using a gelatin has the further defects that the gel strength increases with time even though it is stored at a constant low temperature and that the gel strength varies very significantly with change of temperature between 5° and 15°C, which is the range of suitable eating temperature in comparison with other gelling agents.

In addition, processes for preparing a powdered mix of a multilayered dessert have been disclosed in Japanese Pat. Publication Gazette No. 18813/73, Japanese Pat. Publication Disclosure Gazette No. 1325/72, U.S. Pat. No. 3,434,848 and British Pat. No. 1,246,029, among others. However, these patented products are not ready to eat in the powdered form in which they are purchased but must be prepared at home in a time-consuming process. In addition, the upper layer of whipped-cream is very different from the better delicious whipped-creams, being a foamy product having large bubbles and poor in texture and taste. Consequently, there is a great need for a process for preparing whipped-cream topping desserts in a continuous industrial process yielding good tasting products.

SUMMARY OF THE INVENTION

Accordingly, it is an object of the present invention to provide a continuous and sanitary process for economically preparing a whipped-cream multi-layered topping dessert composed of an upper layer of whipped-cream and a lower layer of dessert base which has an attractive appearance and the taste peculiar to cream and which is easily preserved.

This and other objects of the present invention, as will hereinafter become clear from the ensuing discussion, have been attained by providing a process for preparing a whipped-cream topping dessert characterized by forming an aqueous mixture containing 10 to 30% by weight of fat, 3 to 6% by weight of milk protein, saccharide, an emulsifier, a thickening agent and a gelling agent, homogenizing, pasteurizing and cooling said mixture to room temperature, then adding an aqueous solution of calcium salt thereto so that the amount of calcium ion is 10 to 35 mg per 1 g of protein in said mixture, whipping and heating it to obtain flowable whipped-cream, topping said whipped-cream onto a lower layer of jelly, pudding, bavarois or the like previously placed into a container at 50° to 70°C, and thereafter solidifying both layers by cooling.

DETAILED DESCRIPTION OF THE PREFERRED EMBODIMENTS

In the present invention a cream mixture (hereinafter called "cream base") for whipped-cream is first prepared. Conventional raw materials used in confectionary or dairy products can be used for the whipped-cream base in the process of the present invention.

Milt fat and/or vegetable fats can be used alone or in combination. The vegetable fats should desirably have melting points of 30° to 50°C. When vegetable fats are used in large quantities, a delicious product can be obtained by also adding cream flavoring. In the present invention, the fat content of the cream base should be about 10 to 30 % by weight, depending upon conventional considerations with regard to overrun and the nature of the lower layer dessert base. When the fat content is over 30 %, difficulties arise in the subsequent steps of pasteurization, homogenization and cooling because the solid content becomes high and the taste is too creamy to be acceptable as a dessert. On the other hand, when the fat content is below 10 %, the taste of cream is too weak for a dessert.

The milk protein content of the cream base is also important since it is responsible for stabilizing the whipped-cream. Skim milk, skim milk powder and sodium caseinate are all suitable as the milk protein source in the present process. However, when skim milk or skim milk powder are used alone, the contents of components other than the milk protein, such as lactone, water, and the like increase. Consequently, it is preferred to use sodium caseinate in conjunction with them. As the saccharide component, lactose and sucrose are preferred. The content should be 12 – 22% in total saccharide.

Suitable emulsifiers for use in the present invention include the various kinds of fatty acid esters used for general foodstuffs such as propylene glycol fatty acid esters, ethylene glycol fatty acid esters, glycerol monofatty acid esters, sorbitan fatty acid esters, sucrose fatty acid esters, lecithin and the like and mixtures thereof. The emulsifier is included to disperse the whipped-cream foam uniformly to make the texture of the product smooth and to maintain the body of the whipped-cream. The amount of emulsifier to be added is usually 0.3 to 0.8 % by weight.

Suitable thickening agents for use in the present invention include vegetable gums, such as locust bean gun, gun arabic, guar gum, gum tragacanth, and the like. These are used to keep the viscosity of the whipped-cream high at elevated temperatures, to aid in whipping and to maintain the permanence of the foam. The amount to be added is generally about 0.015 to 0.15 %, preferably 0.05 to 0.15%. Suitable gelling agents for use in the present invention include gelatin, carrageenan, furcellaran, agar-agar, pectin, and the like. Gelatin is used for forming a smooth texture in the whipped-cream while carrageenan, furcellaran, agar-agar and the like are used for increasing the rigidity of body. As a result, gelatin is generally used in combination with the other gelling agents. The amount of gelling agent to be added to the cream base is usually 0.3 to 0.6 % by weight, while the percentage of gelatin in the mixture of gelling agents should be about 60 %. Conventional coloring and flavoring agents for general foodstuffs can be added in the usual manner.

The cream base is prepared by blending the above-described raw materials and subsequently homogenizing, pasteurizing and cooling the blend to room temperature. The cream base is heated to 65° to 75°C for homogenizing under a first homogenizing pressure of 40 to 70 Kg/cm$^2$ and under a second pressure of 10 to 30 Kg/cm$^2$. When the fat is not well dispersed in the cream base, it is necessary to have previously emulsified the fat under a homogenizing pressure of 0 to 20 Kg/cm$^2$ in accordance with conventional methods. Suitable heat treatments for killing harmful bacteria include holding pasteurization, HTST and UHT. Although, in the present invention, it is not necessary to cool the cream base to a temperature lower than 15°C because of its excellent foaming property, temperatures above 25°C should not be used since the protein can coagulate to form a large curd when the calcium salt is added in the subsequent step.

Next, an aqueous solution of a calcium salt prepared so as to have a calcium ion ($Ca^{++}$) content per 1 g of protein in accordance with this invention is gradually added, at room temperature, to the cream base already cooled to room temperature and is mixed with stirring. The liquid mixture so obtained is immediately whipped to obtain a whipped-cream of 60 to 120 % in overrun. The addition of the calcium salt may be carried out after the whipping of the cream base. However, in such a case it is necessary to make the overrun of whipped-cream higher by about 10 % than the final value after the salt is added. The optimum overrun in the whipping treatment depends upon the percentage of fat in the cream base. For example, the taste is good when overruns of about 60 %, 85 % and 120 % are used in conjunction with fat percentages of 10 %, 20 % and 30 %, respectively. The whipped-cream is maintained at a temperature of 25° to 30°C in order to fix the protein with $Ca^{++}$ and to stabilize the foam bubbles in the whipped-cream. Additionally, this simultaneously maintains the flowability of the whipped-cream base at 1,000 to 5,000 cp.

In the present invention, suitable lower layers of the dessert base include jelly, pudding, bavarois and the like. They may be constituted by any known formula and prepared by any conventional manufacturing process. Heretofore, only modified starch or gelatin could be used for the jellies or puddings of desserts topped with whipped-cream layers made in Europe and America because they are cooled to below 10°C in order to form a paste or weak gel. However, in the present invention, any gelling agent can be used in the lower layer base and various kinds of lower layer bases, of various tastes and textures, can be applied.

In the present invention, as described above, the lower layer of the dessert base is a liquid at a temperature of 50° to 70°C since it is not previously cooled to below 10°C as in the conventional process. The upper layer of whipped-cream is also a flowable liquid. By heating the whipped-cream to 25° to 30°C, $Ca^{++}$ combine with the protein and fix and stabilize the foam bubbles. In addition, at the time of topping, the affinity between $Ca^{++}$ and the protein is enhanced by heat from the dessert base and the foam bubbles are further stabilized. As a result, the liquids do not mix at the time of topping and the whipped-cream foam is maintained in a stable state all through the time of preparation and during preservation.

In the preparation of a whipped-cream topping dessert, the degree of the separation of the upper whipped-cream layer from the lower dessert base layer, the degree to which the foam bubbles in the whipped-cream disappear at the time of preparation and during preservation, the texture of the whipped cream and the taste and texture of the dessert base are all important factors for determining the quality of the final product. All these features are superior in the product of the present invention.

In the preparation of a dessert base excellent in taste and texture, better results are obtained by use of a gelling agent of high gelling temperature, e.g., carrageenan, furcellaran, pectin, agar-agar, and the like, than by use of a gelling agent of low gelling temperature, e.g., gelatin and modified starch. Thus, various textures and tastes of the gellified product can be obtained. The present invention is advantageous in that the temperature of topping the lower layer dessert base is higher than the gelling temperature and is generally 50° to 70°C. When conventional creams are whipped and are used as whipped-cream toppings on lower layer dessert bases at such a temperature, the foam bubbles in the whipped-cream disappear and both layers become mixed. Therefore, the desired multiple-layered product cannot be obtained.

As a result of extensive research, the present inventors have found that highly desirable whipped-cream toppings having good texture and permanence of foam can be prepared without becoming mixed with the lower layer dessert base when layered in the container by increasing the protein content of the whipped-cream, adding more calcium salt thereto and moderately reacting the milk protein with $Ca^{++}$ during the preparation process.

The present invention differs from the conventional process for whipped-cream topping desserts in which a dessert base is placed into a container at 50° to 70°C, solidified by cooling at below 10°C, and whipped-cream is topped thereupon at below 10°C, as follows:

1. In this invention, the whipped-cream, in which the milk protein has been denatured and fixed by the addition of a calcium salt followed by heating and which simultaneously is provided with good flowability so as to easily and uniformly fill the container, is topped onto a dessert base at 50° to 70°C, i.e., at above room temperature;

2. The foam in the whipped-cream of the present invention maintains its mechanical rigidity when the topped product is cooled for solidification and when it is placed on the shelf for sale; and 3. the layer of whipped-cream at room temperature and the lower layer dessert base at the higher temperature do not mix with each other as they are filled in the liquid state.

In the present process, the fat content of the whipped-cream should be 10 to 30 %, and the milk protein content 3 to 6 %. This may be seen from the results of Test No. 1 conducted on the effect of these contents on the degree of separation of the layers and on the permanence of the foam and the texture of the whipped-cream.

Test No. 1.

10 Kg of each of the 18 kinds of whipped-cream samples shown in the table below having fat contents of 10 %, 20 % or 30 % and protein contents of 1.0 %, 2.0 %, 3.0 %, 4.5 %, 6.0 % or 7.0 % were prepared as follows:

The fat used was a commercial mixture of butter oil and refined hardened cotton seed oil (m.p. 36.4°C) in he weight ratio of 4 : 6. A mixture of 7 parts of a commercial skim milk powder and 3 parts of a commercial mixture of sodium caseinate and lactose (protein content 33 %) was used as the protein source. A mixture of commercially available gelatin, carrageenan and locust bean gum for use as a gelling agent and thickening agent, a mixture of commercially available fatty acid glycol ester and lecithin for use as an emulsifier, commercially available common salt, sodium citrate, and a mixture of vanilla flavoring and milk flavoring were all added in amounts of 0.05 kg, 0.07 kg, 0.003 kg, 0.025 kg and 0.015 kg, respectively, to each sample.

Each raw material was added to 5 kg of water and additional water was added thereto so that the total weight was 9 kg. The blend was homogenized in two pressure stages, at 50 Kg/cm² and at 10 Kg/cm² at 70°C, pasteurized by heating at 80°C for 10 minutes and cooled to 18°C. A mixture of commercially available calcium lactate and calcium chloride in a weight ratio of 7 : 3 was dissolved in 1 kg of water and was gradually added to 9 kg of each sample so that the Ca$^{++}$ content was 17 mg per 1 g of protein in each sample. Each sample was then whipped at 18°C with an overrun of 100 %.

| Fat content (%) | Protein content (%) | Amount of butter oil, and refined vegetable fat (kg) | Amount of mixture of skim milk powder, sodium caseinate and lactose (kg) |
|---|---|---|---|
| 10 | 1.0 | 1.0 | 0.29 |
| 10 | 2.0 | 1.0 | 0.58 |
| 10 | 3.0 | 1.0 | 0.87 |
| 10 | 4.5 | 1.0 | 1.31 |
| 10 | 6.0 | 1.0 | 1.74 |
| 10 | 7.0 | 1.0 | 2.03 |
| 20 | 1.0 | 2.0 | 0.29 |
| 20 | 2.0 | 2.0 | 0.58 |
| 20 | 3.0 | 2.0 | 0.87 |
| 20 | 4.5 | 2.0 | 1.31 |
| 20 | 6.0 | 2.0 | 1.74 |
| 20 | 7.0 | 2.0 | 2.03 |
| 30 | 1.0 | 3.0 | 0.29 |
| 30 | 2.0 | 3.0 | 0.58 |
| 30 | 3.0 | 3.0 | 0.87 |
| 30 | 4.5 | 3.0 | 1.31 |
| 30 | 6.0 | 3.0 | 1.74 |
| 30 | 7.0 | 3.0 | 2.03 |

90 ml of the dessert base prepared in the same manner as in Example 1, hereinafter described, was placed into a commercial transparent plastic container. 20 ml of the above-described whipped-cream made flowable by heating to 25°C was immediately topped thereupon. Each sample thus topped was stored at 5°C for 5 days and tested regarding the following three characteristics:

1. Separation of layers:

The degree of separation of the upper layer of whipped-cream topping from the lower layer of strawberry jelly is shown in Table 1 as follows:

+ : mixing of both layers due to the sinking or hanging down of the whipped-cream into the intersurface is observed.

− : separation of both layers is good and diffusion into the intersurface is not observed.

2. Permanence of foam:

The foam stability of the whipped-cream topping is shown in Table 1 as follows:

++ : The foam bubbles have almost disappeared or only partially remain.

+ : The foam bubbles are coarse but have not disappeared.

− : The foam bubbles have not disappeared and remain fine.

3. Texture:

The hardness and texture of the whipped-cream topping are shown in Table 1 as follows:

++ : Fluffy, wet in texture and too soft.

+ : Dry in texture but soft.

− : Dry in texture and hard.

TABLE 1

Effect of protein content

| Fat Content | | Protein content 1.0 | *2.0 | 3.0 | 4.5 | 6.0 | 7.0 |
|---|---|---|---|---|---|---|---|
| 10 | Separation of two layers | − | − | − | − | − | − |
|  | Permanence of foam | ++ | ± | − | − | − | − |
|  | Texture | ++ | ± | − | − | − | − |
| 20 | Separation of two layers | + | + | − | − | − | − |
|  | Permanence of foam | ++ | ++ | − | − | − | − |
|  | Texture | ++ | ++ | − | − | − | − |
| 30 | Separation of two layers | + | + | − | − | − | excessively thickened |
|  | Permanence of foam | ++ | ++ | − | − | − | |
|  | Texture | + | ++ + | − | − | − | |

Note: *Protein content of common cream used for whipping (fat 45%)

As is evident from Table 1, the preferred range of milk protein content in the cream base is 3.0 to 6.0 % regardless of the fat content. That is, the protein content clearly has an effect on the promotion of the separation of the two layers, on the permanence of the foam and on the quality of the texture. However, a protein content above 7.0 % is not preferred for reasons of taste because of the resultant inferiority in creamy feel. When the fat content of the cream base is 10 %, the amount of $Ca^{++}$ added has considerable influence on the whipped cream. The amount of $Ca^{++}$ added per 1 g of protein must be increased proportionately with the protein content in order to obtain a product which has good texture, permanence of foam and layer separation.

In the present invention, although any calcium salt suitable for addition to food can be used, it is most preferred to use calcium chloride as long as no bitter taste results. If bitterness is a problem, calcium gluconate or calcium lactate can be partially substituted for the purpose. In the present invention, the addition of the calcium salt is preferably carried out at room temperature or lower after the pasteurization, since when added before pasteurization, a curd is produced and the desired product cannot be obtained.

The influence of the amount of $Ca^{++}$ added on the properties of the resultant whipped-cream topping was determined in the following test.

Test No. 2

The formula and preparation of the whipped cream, the preparation of the dessert base and the standards of evaluation were all similar to those employed in Test 1 but the skim milk powder and sodium caseinate were used in amounts to make the protein content of the cream base constant at 4.5 %. 8 whipped-cream compositions, each differing in the amount of $Ca^{++}$ added (from 0 (Control) to 60.0 mg per 1 g of protein) were prepared. A whipped-cream topping dessert was made using each of these creams. As is evident from Table 2, the preferred range of the $Ca^{++}$ content is 10.0 to 35.0 mg per 1 g of protein when the fat content of the cream base is 10 % and 7.0 to 35.0 mg per 1 g of protein when the fat content is 20 % or 30 %. These amounts of $Ca^{++}$ are remarkably effective for moderately increasing the viscosity and improving the permanence of foam after whipping. Therefore, in the present invention, the amount of $Ca^{++}$ to be added is preferably 10.0 to 35.0 mg per 1 g of protein. The above test was conducted on samples containing 4.5 % protein. The same results were obtained on samples containing 3 to 6 % protein.

Table 2

| Fat | | $Ca^{++}$ mg/Protein g | Effect of amount of $Ca^{++}$ added | | | | | | |
|---|---|---|---|---|---|---|---|---|---|
| | | | 0 (Control) | 7.0 | 10.0 | 20.0 | 35.0 | 40.0 | 50.0 | 60.0 |
| 10% | Separation of two layers | | + | + | − | − | − | − | − | − |
| | Permanence of foam | | ++ | ++ | − | − | − | A | | B |
| | Texture | | ++ | ++ | − | − | − | | | |
| 20% | Separation of two layers | | − | − | − | − | − | − | − | − |
| | Permanence of foam | | − | − | − | − | − | A | | B |
| | Texture | | + | ± | − | − | − | | | |
| 30% | Separation of two layers | | + | − | − | − | − | − | − | − |
| | Permanence of foam | | + | ± | − | − | − | A | | B |
| | Texture | | + | ± | − | − | − | | | |

NOTE:
A: The milk serum became slightly separated upon heating.
B: The milk serum became separated upon heating.

Test No. 3

The relationship between the protein content of the whipped-cream and the permanence of the foam was determined as a function of time.

Four kinds of bases for whipped-cream, each having 30 % fat contents, and 1.5 %, 3.0 %, 4.5 % and 6.0 % protein contents, respectively, were prepared in the same manner as in Test 1.

These cream bases were each whipped to 100 % overrun and a 200 ml portion of whipped-cream was weighted by a 200 ml mesh cylinder and maintained at 35°C. Then, that part of the volume from which foam disappeared at 35°C was measured at 2, 3, 4, 5, 6, 6.5 and 16 hours after preparation. The degree of foam disappearance was calculated according to the following formula:

$$\text{Degree of foam disappearance} = \frac{\text{Decrease in volume of foam (ml)}}{200 \text{ (ml)}} \times 100$$

Test No. 4

The relationship between the amount of $Ca^{++}$ added and the permanence of foam was determined as a function of time. Four kinds of bases for whipped-cream, each having a content of 30 % and 4.5 % in fat and protein, respectively, and of 0, 7, 10 and 20 mg of $Ca^{++}$ added per 1 g of protein, respectively, were prepared in the same manner as in Test No. 2. These cream bases were tested for permanence of foam after 1, 2, 3, 4, 5, 6 and 16 hours from preparation in the same manner as in Test No. 3.

Considering the fact that, in case of practical manufacture of a multi-layered dessert, the time required from topping of the dessert to cooling (e.g., to 10°C) is generally within about 4 hours, it is possible to prepare a topping whipped-cream which is high in foam stability and which has good taste and texture by using a whipped-cream prepared with the optimum protein content and the optimum amount of added $Ca^{++}$ in accordance with the present invention.

Therefore, according to the present invention, whipped-cream having a 60 to 120% overrun at room temperature can be obtained using a cream with a low fat content of 10 to 30 %, containing a relatively high protein content of 3.0 to 6.0 % and having 10 to 35 mg of $Ca^{++}$ per 1 g of protein. Also, various kinds of whipped-cream topping desserts excellent in appearance and taste can be prepared by using a dessert base of jelly, pudding, bavarois, or the like which are maintained at an elevated temperature with a gelling agent such as carrageenan, furcellaran, pectin, agar-agar, or the like which have a high gelling temperature. Hitherto, this could not be done. It is possible here because the temperature of the whipped-cream is raised up to 30° to 35°C when it is topped onto the lower layer dessert base at 50° to 70°C and, from the results of Test No. 4, the whipped-cream has good permanence of foam even at 30° to 35°C.

In the present invention, the conventional steps of preparation of mix, homogenization, pasteurization and subjection to whipping treatment by a continuous type of freezer are employed. But then, differing from the conventional filling method in which whipped-cream with a viscosity above about 10,000 c P at a temperature of below 10°C is topped onto the base during pump out, the whipped-cream is placed onto the lower layer dessert base in a floable state with a viscosity of 1,000 to 5,000 c P at a temperature of 25° to 30°C. Therefore, in the present invention, the topping operation can be continuously and efficiently carried out, and a multi-layered dessert having good preservability can be prepared in a sanitary operation. Moreover, even when the topped product is solidified by cooling and is preserved in an ordinary refrigerator for a long period of time, the nature of the foam of the topping whipped-cream is fine and stable and the whipped-cream topping dessert has an attractive appearance, texture and taste.

Having generally described the invention, a more complete understanding can be obtained by reference to certain specific Examples, which are provided herein for purposes of illustration only and are not intended to be limiting unless otherwise specified.

EXAMPLE 1

Whipped-cream having a 10 % fat content and a jelly type dessert base were separately prepared. Their compositions were as follows:

Cream for whipping having 10% fat content

| | (by weight) |
|---|---|
| Skim milk powder | 9.0% |
| A mixture of sodium caseinate and lactose (as used in Test No. 1) | 4.0 |
| Sugar | 10.0 |
| Vegetable oil -- Refined hardened cotton seed oil (m.p. 36.4°C) (commercially available) | 6.0 |
| Desalted butter | 4.8 |
| Gelling agent or thickening agent -- a mixture of commercially available gelatin, carrageenan, and locust bean gum, in the ratio of 5:4:1 | 0.60 |
| Emulsifier -- a mixture of commercially available fatty acid glycol ester and lecithin in the ratio of 4 : 1 | 0.67 |
| Sodium citrate | 0.25 |
| Salt | 0.03 |
| Vanilla and milk flavoring | 0.15 |
| Water | 54.50 |
| | 90.0 |

-continued
Cream for whipping having 10% fat content

| | |
|---|---|
| Aqueous solution of calcium salt (containing calcium chloride 0.1125% and calcium lactate 0.2561%) | 10.00 |
| | 100.00 |

Lower layer of dessert base (jelly type)

| | |
|---|---|
| Sugar | 17.7% |
| Commercially available strawberry juice having 20% sugar added | 13.0 |
| Gelling agent - commercially available carrageenan | 0.9 |
| Citric acid | 0.2 |
| Buffer salt -- a mixture of commercially available sodium citrate and sodium polyphosphate in the ratio of 1 : 1 | 0.15 |
| Strawberry flavoring | 0.25 |
| Natural color | 0.10 |
| Water | 67.70 |
| | 100.00 |

Desalted butter, the vegetable oil and the emulsifier, melted and maintained at 70°C, and the other raw materials dissolved in water at 70°C were mixed and emulsified with stirring. The blend was then homogenized in the two stages at 10 Kg/cm² and 40 Kg/cm² at 70°C, pasteurized at 85°C for 5 minutes and cooled to room temperature to prepare a cream base. 100 g of an aqueous solution of the calcium salt of about 4 % concentration were gradually added to 900 g of the resulting cream base and mixed with stirring. Thereafter, the mixture was whipped at room temperature (15°C) to overrun by about 60 %, and then heated mildly to 25°C to obtain a whipped-cream of about 3,000 c P in viscosity and having good flowability.

The lower layer of dessert base was prepared by dissolving the raw materials in hot water at 60°C while stirring, pasteurizing at 85°C for 5 minutes. The product was placed into a 90 ml container maintained at 65°C, and immediately thereafter, 20 ml of the above whipped-cream was topped thereupon, cooled and solidified, thereby preparing a whipped-cream topping dessert.

The product was a dessert having a lower layer of a dessert base topped with an upper layer of whipped-cream containing fine foam bubbles and having good texture and taste. Mixing of both layers was not observed. The product remained unchanged in taste, appearance and texture even after preserved at 10°C for 10 days.

EXAMPLE 2

Whipped-cream having a 30 % fat content and a pudding type of dessert base were prepared.
The compositions were as follows:

Cream for whipping having a 30 % fat content

| | |
|---|---|
| Skim milk powder | 9.0 % |
| Sodium caseinate | 4.0 |
| Sugar | 10.0 |
| Vegetable oil (same as in Example 1) | 18.0 |
| Desalted butter | 14.4 |
| Gelling or thickening agent (same as in Example 1) | 0.40 |
| Emulsifier (same as in Example 1) | 0.67 |
| Sodium citrate | 0.25 |
| Salt | 0.03 |
| Vanilla and milk flavoring | 0.15 |
| Water | 33.1 |
| Aqueous calcium salt solution (same as in Example 1) | 90.00 |
| | 10.00 |
| | 100.00 |

Lower layer of dessert base (pudding type)

| | |
|---|---|
| Whole milk powder | 4.53 % |

-continued

| | |
|---|---|
| Skim milk powder | 5.00 |
| Sugar | 14.50 |
| Corn starch | 1.00 |
| Gelling agent (same as Example 1) | 0.25 |
| Cocoa powder | 2.00 |
| Salt | 0.25 |
| Natural color | 0.07 |
| Water | 72.40 |
| | 100.00 |

The base for whipped-cream was prepared in the same manner as in Example 1, except the overrun of whipped-cream was about 120 %. The dessert base lower layer was prepared by dissolving the raw materials in hot water at 50°C while stirring, homogenizing at 150 Kg/cm$^2$ at 80°C and pasteurizing at 85°C for 10 minutes. This dessert base was placed into a 90 ml container while being maintained in the liquid state at a temperature of 65°C. Immediately thereafter, 20 ml of the above whipped-cream was topped thereupon. It was cooled and solidified, yielding a whipped-cream topping dessert. The product was a dessert having a lower layer dessert base topped with an upper layer of whipped-cream containing fine foam bubble and having good texture and taste. Mixing of both layers was not observed. The product remained unchanged in taste, appearance and texture even after being preserved at 10°C for 10 days.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a whipped-cream topping dessert comprising the steps of:
    a. formulating an aqueous mixture containing 10 to 30 percent by weight of fat, 3 to 6 percent by weight of milk protein, 12 to 22 percent by weight of saccharide, 0.3 to 0.8 percent by weight of emulsifier, 0.05 to 0.15 percent by weight of thickening agent and 0.3 to 0.6 percent by weight of gelling agent;
    b. homogenizing said mixture;
    c. pasteurizing and cooling the mixture to room temperature;
    d. thereafter adding an aqueous solution of a calcium salt to said mixture so that the amount of calcium ion in said mixture is 10 to 35 mg. per 1 gram of the milk protein;
    e. whipping and heating the resultant mixture at a temperature of 25° to 30°C to prepare a flowable whipped-cream;
    f. topping said whipped-cream onto a lower layer dessert base maintained at a temperature of 50° to 70°C which has previously been placed into a container; and
    g. solidifying both layers by cooling 2. The process of claim 1 wherein the fat is at least one of milk fat or vegetable fat having a melting point of from 30° to 50°C.

3. The process of claim 1, wherein the milk protein is at least one of skim milk, powdered skim milk or casein.

4. The process of claim 1, wherein the saccharide is at least one of lactose or sucrose.

5. The process of claim 1, wherein the emulsifier is at least one member selected from the group consisting of propylene glycol fatty acid esters, ethylene glycol fatty acid esters, glycerol mono-fatty acid esters, sorbitan fatty acid esters, sucrose fatty acid esters and lecithin.

6. The process of claim 1, wherein the thickening agent is selected from the group consisting of locust bean gum, gum arabic, guar gum and gum tragacanth.

7. The process of claim 1, wherein the gelling agent is selected from the group consisting of gelatin, carrageenan, furcellaran, agar-agar and pectin.

8. The process of claim 1, wherein the calcium salt is calcium chloride, calcium gluconate or calcium lactate.

9. A whipped-cream topping dessert having whipped-cream with excellent permanence of foam and having no mixing between the layer containing the whipped-cream topping and the lower layer during preservation, consisting of a dessert base lower layer and a whipped-cream topping which contains 10 to 30 percent by weight of fat, 3 to 6 percent by weight of milk protein, 12 to 22 percent by weight of saccharide, 10 to 35 mg. of calcium ion per 1 gram of milk protein, a gelling agent of carrageenan, furcellaran, agar-agar, pectin or gelatin in the amount of 0.3 to 0.6 percent by weight, a thickening agent of locust bean gum, gum arabic, guar gum or gum tragacanth in the amount of 0.05 to 0.15 percent by weight, and an emulsifier of propylene glycol fatty acid esters, ethylene glycol fatty acid esters, sucrose fatty acid esters, sorbitan fatty acid esters, glycerol mono fatty acid esters or lecithin in the amount of 0.3 to 0.8 percent by weight.

10. The process of claim 1, wherein the dessert base lower layer is comprised of at least one of jelly, pudding or bavarois.

* * * * *